United States Patent
Godazandeh et al.

(10) Patent No.: US 11,542,101 B2
(45) Date of Patent: Jan. 3, 2023

(54) SYSTEMS, METHODS, AND COMPUTER PROGRAM PRODUCTS FOR IMPROVED CONTAINER TRANSPORTATION

(71) Applicant: INTELLIGRATED HEADQUARTERS, LLC, Mason, OH (US)

(72) Inventors: Kiara Godazandeh, Pittsburgh, PA (US); Seyed Shahab Mofidi, Alpharetta, GA (US); Amirhossein Rafati, Atlanta, GA (US); Akhila Puthengot, Atlanta, GA (US)

(73) Assignee: INTELLIGRATED HEADQUARTERS, LLC, Mason, OH (US)

( * ) Notice: Subject to any disclaimer, the term of this patent is extended or adjusted under 35 U.S.C. 154(b) by 218 days.

(21) Appl. No.: 16/936,946

(22) Filed: Jul. 23, 2020

(65) Prior Publication Data
US 2022/0024699 A1    Jan. 27, 2022

(51) Int. Cl.
*B65G 37/02* (2006.01)
*B65G 1/137* (2006.01)
(Continued)

(52) U.S. Cl.
CPC .......... *B65G 37/02* (2013.01); *B65G 1/1376* (2013.01); *B65G 43/10* (2013.01); *B65G 47/493* (2013.01);
(Continued)

(58) Field of Classification Search
CPC ...... B65G 1/1376; B65G 37/02; B65G 43/08; B65G 43/10; B65G 47/493; B65G 2811/0678
See application file for complete search history.

(56) References Cited

U.S. PATENT DOCUMENTS 10,410,895 B2 *  9/2019  Kumagai ............ H01L 21/6773
2012/0029689 A1 *  2/2012  Baier ................. G05B 19/4189
                                                          700/230
(Continued)

FOREIGN PATENT DOCUMENTS

DE    102009047036 A1    5/2011
EP         3575243 A1   12/2019

OTHER PUBLICATIONS

Extended European search report dated Dec. 10, 2021 for EP Application No. 21184390, 9 pages.

*Primary Examiner* — Gene O Crawford
*Assistant Examiner* — Keith R Campbell
(74) *Attorney, Agent, or Firm* — Alston & Bird LLP

(57) ABSTRACT

Methods, apparatuses, devices, and computer program products are disclosed for container transportation. An example system includes a conveyor network that includes a plurality of conveyors and each conveyor supports one or more containers thereon. Each conveyor defines a conveyor length and a conveyor operating speed. The system further includes a computing device operably coupled to the conveyor network. The computing device receives a starting location and a destination location of a first container within the conveyor network and receives an operating density for each conveyor in the conveyor network. The computing device determines a first travel path for the first container between the starting location and the destination location based upon the conveyor length, the conveyor operating speed, and the operating density for each conveyor in the conveyor network. The first travel path minimizes a total travel time for the first container between the starting location and the destination location.

20 Claims, 7 Drawing Sheets

(51) Int. Cl.
   *B65G 43/10* (2006.01)
   *B65G 47/49* (2006.01)
   *B65G 43/08* (2006.01)

(52) U.S. Cl.
   CPC ...... *B65G 43/08* (2013.01); *B65G 2811/0678* (2013.01)

(56) References Cited

U.S. PATENT DOCUMENTS

2015/0142168 A1* 5/2015 Holland ................. G06Q 10/04
                                                    700/228
2018/0300435 A1  10/2018 Eckman et al.
2021/0380348 A1* 12/2021 Futami .................. B65G 47/52
2022/0017306 A1*  1/2022 Fourney ................ B65G 47/46

* cited by examiner

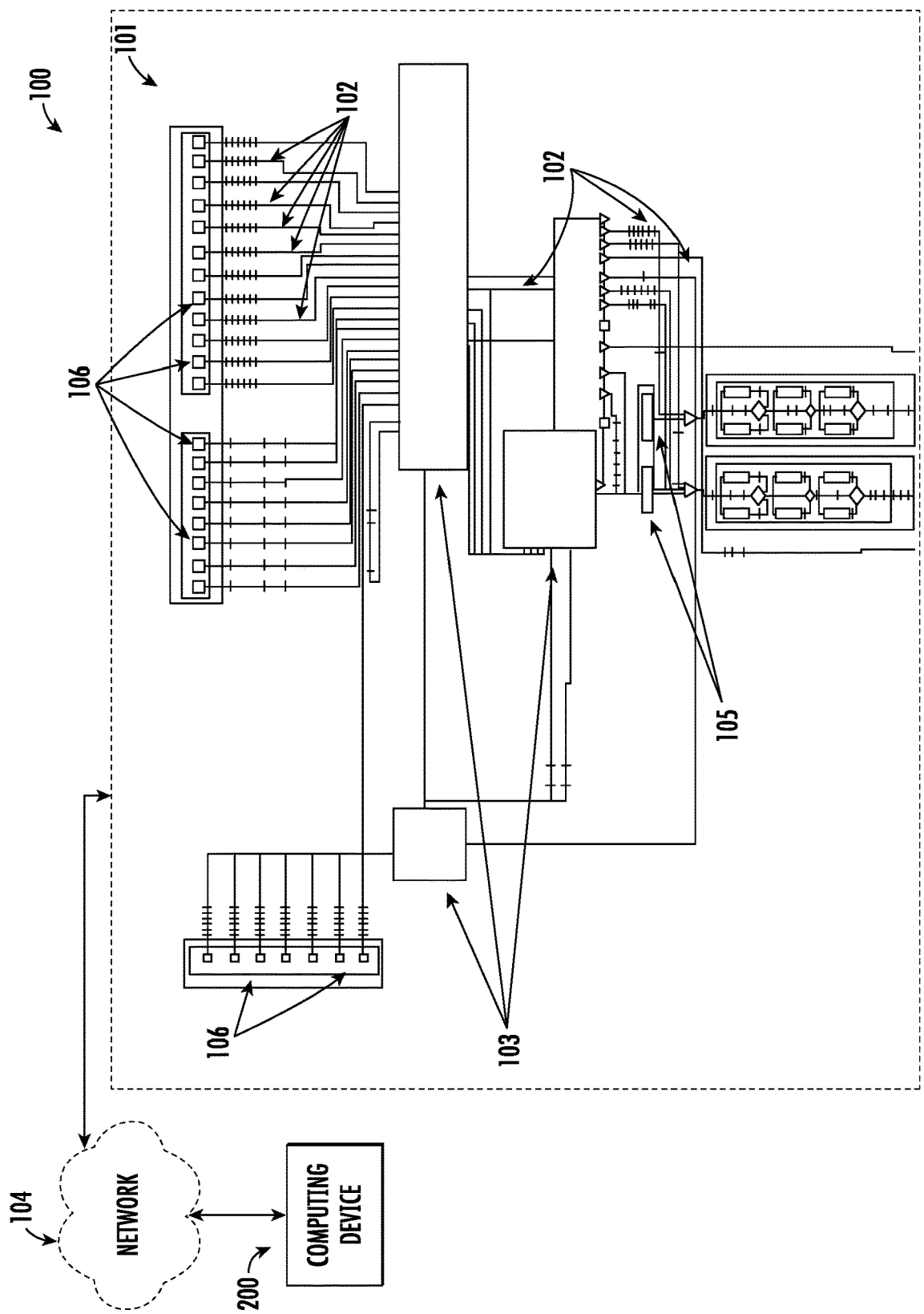

SYSTEMS, METHODS, AND COMPUTER PROGRAM PRODUCTS FOR IMPROVED CONTAINER TRANSPORTATION

Example embodiments of the present invention relate generally to material handling systems and, more particularly, to methods, systems, and computer program products for improved container transportation.

BACKGROUND

Warehouses, distribution centers, and other material handling environments often rely on a number of components, systems, and the like for transporting products, articles, items, etc. to and from various locations within these environments. In some instances, one or more conveyors or conveyor segments are used in order to transport containers between locations within the material handling environments. The inventors have identified numerous deficiencies with these existing technologies in the field, the remedies for which are the subject of the embodiments described herein.

BRIEF SUMMARY

As noted above, traditional warehouses and distribution centers may rely upon a collection of connected conveyors to transport containers throughout these material handling environments. In some instances, these conveyors may be interconnected between various nodes (e.g., connection locations adjacent conveyors) such that human or automated operators may interact with containers supported by the conveyors. For example, a vehicle transporting a plurality of containers may be unloaded and the containers may be provided to a conveyor network in order to move the containers to their respective locations within the material handling environment (e.g., for unloading, storage, further transportation, or the like). Due to the complexities associated with the number of potential conveyors in the network, the associated physical limitations of these conveyors (e.g., length and operating speed), and the associated volume of containers simultaneously transported by the conveyor network, the time associated with transportation of a single container may vary greatly based upon the path of conveyors selected. Furthermore, each container may house one or more items, packages, or the like therein each associated with different delivery locations within the material handling environment. For example, a container may be ultimately transported to a final destination; however, the container may be processed (e.g., one or more items within the container removed, one or more items added to the container, or the like) at various nodes within the network. As such, traditional container transportation systems often suffer from various deficiencies associated with inefficient container travel route selection and the inability to dynamically adjust travel routes in order to account for varying operating speeds, conveyor congestion, and package delivery locations.

To solve these issues and others, example implementations of embodiments of the present invention may determine the conveyor length, operating speed, and operating density (e.g., container congestion) associated with each conveyor in the conveyor network and dynamically select a set of conveyors that minimizes the total travel time for a container between a starting and destination location. Unlike the rigidity provided by traditional systems, embodiments described herein may operate to identify changes in one or more of the operating speed, conveyor length, or operating density of any conveyor within the conveyor network and dynamically modify the travel path of each container in order to minimize travel time for all containers supported by the described system. Furthermore, the embodiments described herein may account for the contents of a particular container in order to ensure packages supported by each container are properly delivered to their respective locations. In doing so, such example implementations reliably increase the throughput of conveyor networks resulting in improved system efficiencies.

Apparatuses, systems, and associated computer program products are therefore provided for improved container transportation. An example system may include a conveyor network of a plurality of conveyors, wherein each conveyor is configured to support one or more containers thereon. Each conveyor may define a conveyor length and a conveyor operating speed. The system may further include a computing device operably coupled to the conveyor network. The computing device may be configured to receive a starting location of a first container within the conveyor network, receive a destination location of the first container within the conveyor network, and receive an operating density for each conveyor in the conveyor network. The conveyor may further determine a first travel path for the first container between the starting location and the destination location based upon the conveyor length, the conveyor operating speed, and the operating density for each conveyor in the conveyor network. The first travel path may be configured to minimize a total travel time for the first container between the starting location and the destination location.

In some embodiments, the computing device may be further configured to determine a travel time for each conveyor in the conveyor network and aggregate the travel times for each set of conveyors connecting the starting location and the destination location, wherein each set of conveyors defines a unique travel path for the first container. The computing device may also determine the total travel time for each set and determine the first travel path as the set of conveyors having the shortest total travel time.

In some embodiments, the computing device may be further configured to determine a change in one or more of the conveyor operating speed, the conveyor length, or the operating density of at least one conveyor in the first travel path and modify the first travel path. In such an embodiment, the computing device may be further configured to modify a second travel path of a second container in response to modification of the first travel path of the first container.

In some embodiments, the conveyor network further includes a plurality of nodes, wherein each node is positioned adjacent at least one conveyor in the conveyor network.

In some further embodiments, the computing device may be configured to identify a package supported by the container, determine a node associated with the package, and modify the first travel path to include the node.

In some other embodiments, the computing device may be configured to identify a package located at a node in the conveyor networking for transporting by the first container, and modify the first travel path to include the node.

The above summary is provided merely for purposes of summarizing some example embodiments to provide a basic understanding of some aspects of the invention. Accordingly, it will be appreciated that the above-described embodiments are merely examples and should not be construed to narrow the scope or spirit of the invention in any way. It will be appreciated that the scope of the invention encompasses many potential embodiments in addition to those here summarized, some of which will be further described below.

BRIEF DESCRIPTION OF THE DRAWINGS

Having described certain example embodiments of the present disclosure in general terms above, reference will now be made to the accompanying drawings. The components illustrated in the figures may or may not be present in certain embodiments described herein. Some embodiments may include fewer (or more) components than those shown in the figures.

FIG. 1A illustrates an example container transportation system including devices that may be involved in some example embodiments described herein;

DETAILED DESCRIPTION

Figure 1B:
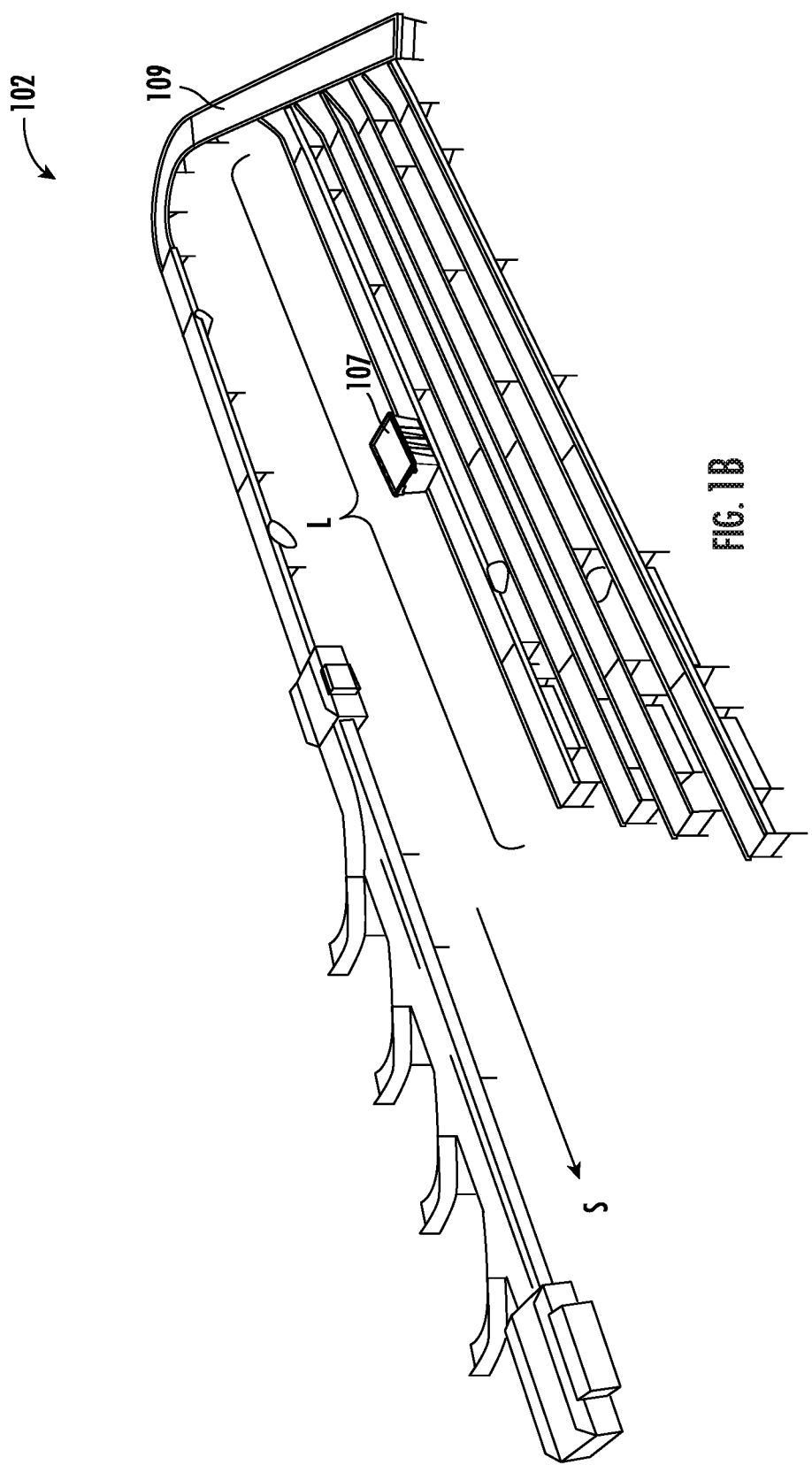
FIG. 1B illustrates an example conveyor of FIG. 1, in accordance with some example embodiments described herein.

Some embodiments of the present invention will now be described more fully hereinafter with reference to the accompanying drawings, in which some, but not all embodiments of the inventions are shown. Indeed, these inventions may be embodied in many different forms and should not be construed as limited to the embodiments set forth herein; rather, these embodiments are provided so that this disclosure will satisfy applicable legal requirements. Like numbers refer to like elements throughout. As used herein, the description may refer to a container transportation system as an example "system." However, elements of the system described herein may be equally applicable to the claimed method, apparatus, and computer program product. Thus, use of any such terms should not be taken to limit the spirit and scope of embodiments of the present invention.

Definition of Terms

As used herein, the terms "data," "information," "electronic information," "signal," "command," and similar terms may be used interchangeably to refer to data capable of being transmitted, received, and/or stored in accordance with embodiments of the present disclosure. Thus, use of any such terms should not be taken to limit the spirit or scope of embodiments of the present disclosure. Further, where a first computing device is described herein to receive data from a second computing device, it will be appreciated that the data may be received directly from the second computing device or may be received indirectly via one or more intermediary computing devices, such as, for example, one or more servers, relays, routers, network access points, base stations, hosts, and/or the like, sometimes referred to herein as a "network." Similarly, where a first computing device is described herein as sending data to a second computing device, it will be appreciated that the data may be sent directly to the second computing device or may be sent indirectly via one or more intermediary computing devices, such as, for example, one or more servers, remote servers, cloud-based servers (e.g., cloud utilities), relays, routers, network access points, base stations, hosts, and/or the like.

As used herein, the term "comprising" means including but not limited to and should be interpreted in the manner it is typically used in the patent context. Use of broader terms such as comprises, includes, and having should be understood to provide support for narrower terms such as consisting of, consisting essentially of, and comprised substantially of.

As used herein, the phrases "in one embodiment," "according to one embodiment," "in some embodiments," and the like generally refer to the fact that the particular feature, structure, or characteristic following the phrase may be included in at least one embodiment of the present disclosure. Thus, the particular feature, structure, or characteristic may be included in more than one embodiment of the present disclosure such that these phrases do not necessarily refer to the same embodiment.

As used herein, the word "example" is used herein to mean "serving as an example, instance, or illustration." Any implementation described herein as "example" is not necessarily to be construed as preferred or advantageous over other implementations.

As used herein, the term "computer-readable medium" refers to non-transitory storage hardware, non-transitory storage device or non-transitory computer system memory that may be accessed by a controller, a microcontroller, a computational system or a module of a computational system to encode thereon computer-executable instructions or software programs. A non-transitory "computer-readable medium" may be accessed by a computational system or a module of a computational system to retrieve and/or execute the computer-executable instructions or software programs encoded on the medium. Exemplary non-transitory computer-readable media may include, but are not limited to, one or more types of hardware memory, non-transitory tangible media (for example, one or more magnetic storage disks, one or more optical disks, one or more USB flash drives), computer system memory or random access memory (such as, DRAM, SRAM, EDO RAM), and the like.

Having set forth a series of definitions called-upon throughout this application, an example system architecture and example apparatus is described below for implementing example embodiments and features of the present disclosure.

Device Architecture and Example System

With reference to FIG. 1A, an example container transportation system 100 is illustrated with a conveyor network 101 that includes a plurality of conveyors 102 (e.g., edges) and nodes 103 and is communicably connected via a network 104 to a computing device 200. Although the example container transportation system 100 is illustrated connected via a network 104, the present disclosure contemplates that, in some embodiments, the computing device 200, conveyors 102, and/or nodes 103 may be in direct connection (e.g., physically connected). Furthermore, the present disclosure contemplates that, in some embodiments, the conveyors 102 and/or the nodes 103 may comprise the computing device 200, or a portion thereof.

As described hereafter with reference to FIG. 1B, the conveyor network 101 may include a plurality of conveyors 102 configured to support one or more containers (e.g., container 107) thereon. Each conveyor in the conveyor network 101 may be interconnected with one or more other conveyors, for example, at a node 103. As such, each node 103 may refer to a location within the conveyor network 101 at which a human or automated operator may interact with the containers transported by the conveyor network 101. By way of example, a node 103 may refer to a loading or unloading location in which containers are added and removed from the conveyor network 101. In some instances, a node 103 may refer to a location at which packages, items, etc. housed by the containers are removed. In this way, the nodes 103 may be defined as a starting location or destination location for a particular container or package supported therein. As illustrated in FIG. 1A, example starting locations 105 and example destination locations 106 are shown; however, the present disclosure contemplates that any location within the conveyor network 101 may be determined to be a starting location 105 or destination location 106 based upon the selected container. As illustrated in FIG. 1A, the nodes 103 of the conveyor network 101 may be positioned at any location and connect any number of adjacent conveyors 102 based upon the intended application of the conveyor network 101.

In order to interact with the containers of the system 100, each node 103 may include one or more robotic arms, sensor systems, scanners, or the like. For example, a node 103 may include a robotic arm configured to pick and place containers at locations within the conveyor network 101 proximate the node 103. Furthermore, in some instances, each node 103 may include sensors (e.g., proximity sensors, cameras, position transducers, resolvers, encoders, rotary sensors, scanners, or the like) configured to identity containers proximate the node 103. Still further, in some embodiments, each node 103 may include a user terminal, controller, or other computing device operably coupled to the conveyor network 101 and the computing device 200. By way of example, a node 103 may include a scanning device configured to scan barcodes, direct parts marking, radio-frequency identification (RFID) tags, or the like located on containers or packages and provide data generated by these terminals to the computing device 200.

With reference to FIG. 1B, an example conveyor 102 is illustrated. As shown, the conveyor 102 may define a conveyance plane, collection of rollers 109, endless belt, or the like configured to transport a container 107. Although illustrated with a collection of motor-driven rollers 109, the present disclosure contemplates that the conveyor 102 and each conveyor within the conveyor network 101 may include any system for transporting or translating objections supported thereon. Furthermore, although illustrated with a linear conveyor 102, the present disclosure contemplates that each conveyor 102 (e.g., conveyor section) in the conveyor network 101 may be independently dimensioned (e.g., sized and shaped) based upon the intended application of the respective conveyor 102 (e.g., conveyor section) and may further be of any type (e.g., slat conveyor, chain conveyor, wheel conveyor, accumulation conveyor, sorting conveyor, etc.).

As illustrated, each conveyor 102 (e.g., conveyor segment) may also define various structural parameters including, for example, a conveyor length L and a conveyor operating speed S. The conveyor length L may refer to the physical distance spanned by the conveyor 102 and may reflect the distance that is traveled by a container 107 supported by the conveyor 102. Although illustrated with a fixed conveyor length L, the present disclosure contemplates that, in some embodiments, the conveyor length L may be changed. For example, the conveyor 102 may, in some instances, comprise a slat conveyor such that one or more slats may be added to or removed from the conveyor 102 resulting in a change of the conveyor length L. The conveyor operating speed S may refer at which the conveyor 102 operates (measured, for example, in feet per minute). In some instances, the conveyor 102 may be operably coupled to a drive motor or equivalent propulsion device configured to cause movement of the conveying plane (e.g., a collection of rollers 109). This conveyor operating speed S may similarly be increased or decreased (during operation or otherwise) based upon the intended application of the conveyor 102.

With continued reference to FIG. 1B, an example container 107 is illustrated. As shown, the container 107 may, in some instances, be dimensioned for supporting one or more packages, items, or the like therein. Although illustrated in FIG. 1B as a rectangular boxed shaped, the present disclosure contemplates that the conveyors 102 and container transportation system 100 may be applicable for use with containers of any size, shape, orientation, or the like. As described above, the container 107 may also include one or more readable indicia (e.g., direct parts marking, barcodes, RFID tags, or the like) configured to be read by one or more scanning devices of the conveyor network 101 (e.g., positioned at nodes 103 or otherwise). In this way, an operator positioned at a node 103 may, via a scanning device (not shown), scan a barcode associated with a proximate container (e.g., container 107) and transmit data to the computing device 200 associated with the container for use with the travel path determinations described hereafter.

With reference to FIG. 1A, the computing device 200 may include circuitry, networked processors, or the like configured to perform some or all of the apparatus-based (e.g., container transportation system-based) processes described herein, and may be any suitable processing device and/or network server. In this regard, the computing device 200 may be embodied by any of a variety of devices. For example, the computing device 200 may be configured to receive/transmit data and may include any of a variety of fixed terminals, such as a server, desktop, or kiosk, or it may comprise any of a variety of mobile terminals, such as a portable digital assistant (PDA), mobile telephone, smartphone, laptop computer, tablet computer, or in some embodiments, a peripheral device that connects to one or more fixed or mobile terminals. Example embodiments contemplated herein may have various form factors and designs but will nevertheless include at least the components illustrated in FIG. 2 and described in connection therewith. In some embodiments, the computing device 200 may be located remotely from the conveyor network 101, the conveyors 102, and/or the nodes 103, although in other embodiments, the conveyor network 101, the conveyors 102, and/or the nodes 103 may comprise the computing device 200 in whole or in part. The computing device 200 may, in some embodiments, comprise several servers or computing devices performing interconnected and/or distributed functions. Despite the many arrangements contemplated herein, the computing device 200 is shown and described herein as a single computing device to avoid unnecessarily overcomplicating the disclosure.

The network 104 may include one or more wired and/or wireless communication networks including, for example, a wired or wireless local area network (LAN), personal area network (PAN), metropolitan area network (MAN), wide area network (WAN), or the like, as well as any hardware, software and/or firmware for implementing the one or more networks (e.g., network routers, switches, hubs, etc.). For example, the network 104 may include a cellular telephone, mobile broadband, long term evolution (LTE), GSM/EDGE, UMTS/HSPA, IEEE 802.11, IEEE 802.16, IEEE 802.20, Wi-Fi, dial-up, and/or WiMAX network. Furthermore, the network 104 may include a public network, such as the Internet, a private network, such as an intranet, or combinations thereof, and may utilize a variety of networking protocols now available or later developed including, but not limited to TCP/IP based networking protocols.

Figure 2:
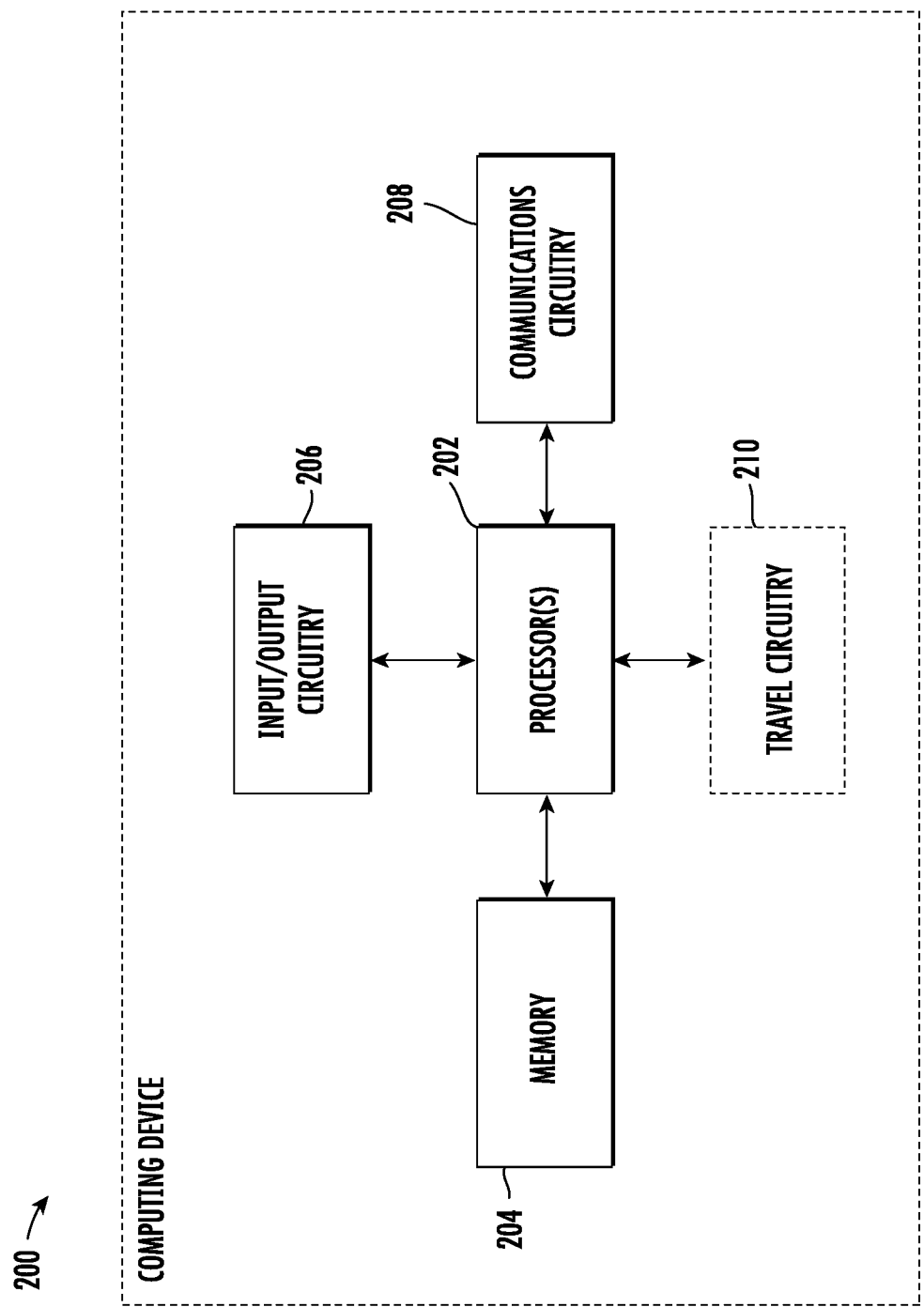
FIG. 2 illustrates a schematic block diagram of example circuitry that may perform various operations, in accordance with some example embodiments described herein.

As illustrated in FIG. 2, the computing device 200 may include a processor 202, a memory 204, input/output circuitry 206, and communications circuitry 208. Moreover, the computing device 200 may include travel circuitry 210. The computing device 200 may be configured to execute the operations described below in connection with FIGS. 3-6. Although components 202-210 are described in some cases using functional language, it should be understood that the particular implementations necessarily include the use of particular hardware. It should also be understood that certain of these components 202-210 may include similar or common hardware. For example, two sets of circuitry may both leverage use of the same processor 202, memory 204, communications circuitry 208, or the like to perform their associated functions, such that duplicate hardware is not required for each set of circuitry. The use of the term "circuitry" as used herein includes particular hardware configured to perform the functions associated with respective circuitry described herein. As described in the example above, in some embodiments, various elements or components of the circuitry of the computing device 200 may be housed within one or more of the conveyors 102 and/or nodes 103. It will be understood in this regard that some of the components described in connection with the computing device 200 may be housed within one of these devices, while other components are housed within another of these devices, or by yet another device not expressly illustrated in FIGS. 1A-1B.

Of course, while the term "circuitry" should be understood broadly to include hardware, in some embodiments, the term "circuitry" may also include software for configuring the hardware. For example, although "circuitry" may include processing circuitry, storage media, network interfaces, input/output devices, and the like, other elements of the computing device 200 may provide or supplement the functionality of particular circuitry.

In some embodiments, the processor 202 (and/or co-processor or any other processing circuitry assisting or otherwise associated with the processor) may be in communication with the memory 204 via a bus for passing information among components of the computing device 200. The memory 204 may be non-transitory and may include, for example, one or more volatile and/or non-volatile memories. In other words, for example, the memory may be an electronic storage device (e.g., a non-transitory computer readable storage medium). The memory 204 may be configured to store information, data, content, applications, instructions, or the like, for enabling the computing device 200 to carry out various functions in accordance with example embodiments of the present invention.

The processor 202 may be embodied in a number of different ways and may, for example, include one or more processing devices configured to perform independently. Additionally or alternatively, the processor may include one or more processors configured in tandem via a bus to enable independent execution of instructions, pipelining, and/or multithreading. The use of the term "processing circuitry" may be understood to include a single core processor, a multi-core processor, multiple processors internal to the computing device, and/or remote or "cloud" processors.

In an example embodiment, the processor 202 may be configured to execute instructions stored in the memory 204 or otherwise accessible to the processor 202. Alternatively or additionally, the processor 202 may be configured to execute hard-coded functionality. As such, whether configured by hardware or by a combination of hardware with software, the processor 202 may represent an entity (e.g., physically embodied in circuitry) capable of performing operations according to an embodiment of the present invention while configured accordingly. Alternatively, as another example, when the processor 202 is embodied as an executor of software instructions, the instructions may specifically configure the processor 202 to perform the algorithms and/or operations described herein when the instructions are executed.

The computing device 200 further includes input/output circuitry 206 that may, in turn, be in communication with processor 202 to provide output to a user and to receive input from a user, user device, or another source. In this regard, the input/output circuitry 206 may comprise a display that may be manipulated by a mobile application. In some embodiments, the input/output circuitry 206 may also include additional functionality including a keyboard, a mouse, a joystick, a touch screen, touch areas, soft keys, a microphone, a speaker, or other input/output mechanisms. The processor 202 and/or user interface circuitry comprising the processor 202 may be configured to control one or more functions of a display through computer program instructions (e.g., software and/or firmware) stored on a memory accessible to the processor (e.g., memory 204, and/or the like).

The communications circuitry 208 may be any means such as a device or circuitry embodied in either hardware or a combination of hardware and software that is configured to receive and/or transmit data from/to a network and/or any other device, circuitry, or module in communication with the computing device 200. In this regard, the communications circuitry 208 may include, for example, a network interface for enabling communications with a wired or wireless communication network. For example, the communications circuitry 208 may include one or more network interface cards, antennae, buses, switches, routers, modems, and supporting hardware and/or software, or any other device suitable for enabling communications via a network. Additionally or alternatively, the communication interface may include the circuitry for interacting with the antenna(s) to cause transmission of signals via the antenna(s) or to handle receipt of signals received via the antenna(s). These signals may be transmitted by the computing device 200 using any of a number of wireless personal area network (PAN) technologies, such as Bluetooth® v1.0 through v3.0, Bluetooth Low Energy (BLE), infrared wireless (e.g., IrDA), ultra-wideband (UWB), induction wireless transmission, or the like. In addition, it should be understood that these signals may be transmitted using Wi-Fi, Near Field Communications (NFC), Worldwide Interoperability for Microwave Access (WiMAX) or other proximity-based communications protocols.

Travel circuitry 210 includes hardware components designed to analyze conveyor length, conveyor operating speed, and operating density. Travel circuitry 210 may utilize processing circuitry, such as the processor 202, to perform its corresponding operations, and may utilize memory 204 to store collected information. The travel circuitry 210 may be housed in whole or in part within the conveyor network 101, nodes 103, and/or the computing device 200. In some instances, the travel circuitry 210 may be configured to, based upon conveyor length, conveyor operating speed, and operating density for each conveyor 102 in the conveyor network 101, determine a first travel path for the first container between the starting location and the destination location. The travel circuitry 210 may further be configured to determine a change in one or more of the conveyor operating speed, the conveyor length, or the operating density of at least one conveyor 102 in the first travel path and modify the first travel path.

It should also be appreciated that, in some embodiments, the travel circuitry 210 may include a separate processor, specially configured field programmable gate array (FPGA), or application specific interface circuit (ASIC) to perform its corresponding functions.

In addition, computer program instructions and/or other type of code may be loaded onto a computer, processor or other programmable circuitry to produce a machine, such that the computer, processor other programmable circuitry that execute the code on the machine create the means for implementing the various functions, including those described in connection with the components of computing device 200.

As described above and as will be appreciated based on this disclosure, embodiments of the present invention may be configured as container transportation systems, methods, and the like. Accordingly, embodiments may comprise various means including entirely of hardware or any combination of software with hardware. Furthermore, embodiments may take the form of a computer program product comprising instructions stored on at least one non-transitory computer-readable storage medium (e.g., computer software stored on a hardware device). Any suitable computer-readable storage medium may be utilized including non-transitory hard disks, CD-ROMs, flash memory, optical storage devices, or magnetic storage devices.

Example Operations for Improved Container Transportation

Figure 3:
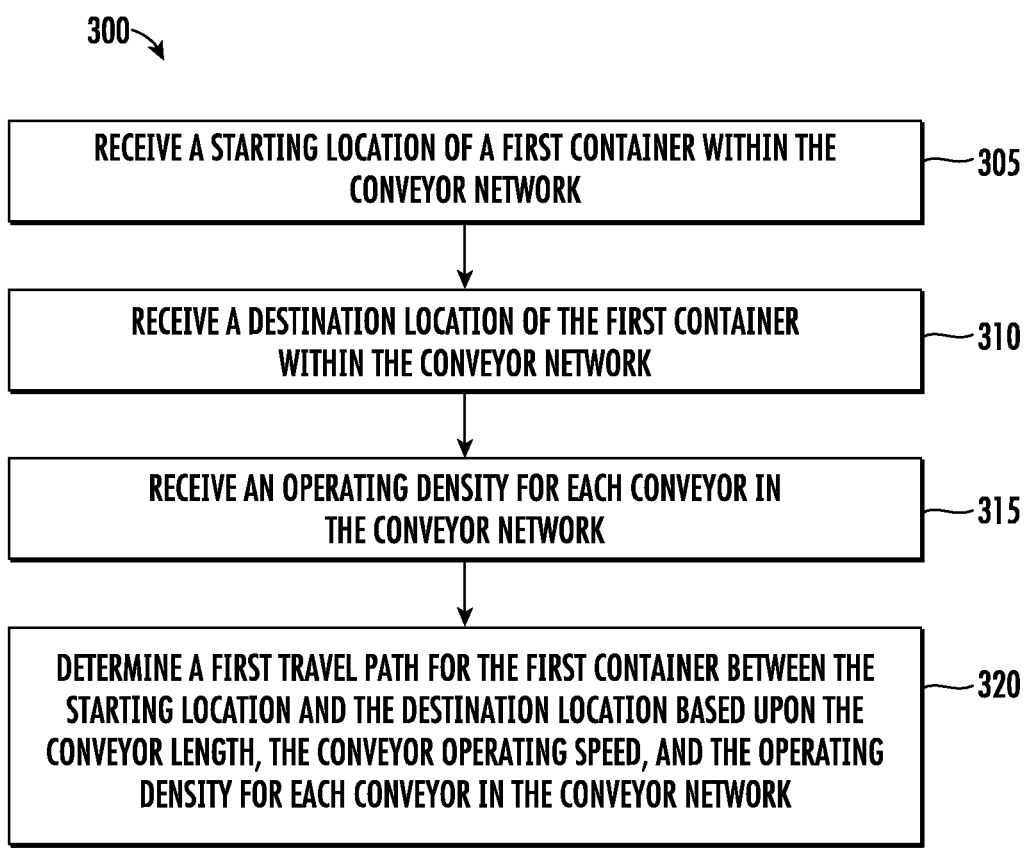
FIG. 3 illustrates an example flowchart for improved container transportation, in accordance with some example embodiments described herein.

FIG. 3 illustrates a flowchart containing a series of operations for improved container transportation. The operations illustrated in FIG. 3 may, for example, be performed by, with the assistance of, and/or under the control of an apparatus (e.g., computing device 200), as described above. In this regard, performance of the operations may invoke one or more of processor 202, memory 204, input/output circuitry 206, communications circuitry 208, and/or travel circuitry 210.

As shown in operation 305, the apparatus (e.g., container transportation system 100 and/or computing device 200) includes means, such as input/output circuitry 206, communications circuitry 208, travel circuitry 210, or the like, for receiving a starting location of a first container within the conveyor network. In some embodiments, the starting location of the first container may be input by a human operator associated with the first container. By way of example, a human or automated operator unloading a transport vehicle may remove the first container from the transport vehicle and input the starting location of the first container. This starting location may, in some embodiments, correspond to the current position of the first container and human or automated operator. In other embodiments, the starting location may correspond to a location within the conveyor network at which the human or automated operator places the container. Furthermore, in some embodiments, the system may include one or more carton erectors located within the network and configured to erect (e.g., build, form, etc.) a container for use within the system.

As described above, in some embodiments, the first container may include readable indicia (e.g., a barcode, an RFID tag, or the like) that includes data indicative of the starting location of the first container. By way of example, a node located proximate the location at which the container enters the conveyor network may include a scanning device configured to receive data from the container in an instance in which the scanning devices scans the readable indicia of the container. Said differently, the scanning device may scan the readable indicia of the container and indicate to the computing device 200 that the starting location of the container corresponds to the physical location of the scanning device. In some embodiments, the system 100 may utilize image analysis techniques, computer vision, or the like in order to determine the starting location of the container. By way of example, the system 100 may include a camera located such that a field of view (FOV) of the camera captures images of the container's entrance into the conveyor network.

As shown in operation 310, the apparatus (e.g., container transportation system 100 and/or computing device 200) includes means, such as input/output circuitry 206, communications circuitry 208, travel circuitry 210, or the like, for receiving a destination location of the first container within the conveyor network. In some embodiments, the destination location of the first container may be input by a human operator associated with the first container. By way of example, a human operator unloading a transport vehicle may remove the first container from the transport vehicle and input the destination location of the first container. This destination location may, in some embodiments, correspond to the final physical position of the first container as denoted by the first container.

Similar to operation 305, in some embodiments, the first container may include readable indicia (e.g., a barcode, an RFID tag, or the like) that includes data indicative of the destination location of the first container. By way of example, a node located proximate the location at which the container enters the conveyor network may include a scanning device configured to receive data from the container in an instance in which the scanning devices scans the readable indicia of the container. Said differently, the scanning device may scan the readable indicia of the container and indicate to the computing device 200 the destination location of the container based upon the readable indicia. In other embodiments, the computing device 200 may, in response to a communication regarding the starting location of the container, query a memory or other repository storing destination locations for containers and retrieve the corresponding destination location for the first container.

As shown in operation 315, the apparatus (e.g., container transportation system 100 and/or computing device 200) includes means, such as input/output circuitry 206, communications circuitry 208, travel circuitry 210, or the like, for receiving an operating density for each conveyor in the conveyor network 101. As described above, the conveyor network and associated conveyors may simultaneously transport a plurality of containers to various locations. As such, the volume of containers on any conveyor may dynamically change. In order to determine the operating density corresponding to the number of containers for each conveyor, the system 100 may include one or more sensing devices, scanning device, camera systems, or the like configured to monitor the volume of containers located on each conveyor. By way of example, each conveyor in the conveyor network may include a camera and/or scanning device configured to identify, via computer vision and readable indicia, respectively, each container located at each conveyor and node. In other embodiments, the operating density of each conveyor may be actively determined in response to travel path determinations. Said differently, once a travel path for a container is determined, the computing device 200 may estimate or predict the location of said container within the conveyor network. As such, the computing unit 200 may similarly determine the operating density for each conveyor based upon the estimated or predicted location of each container.

As described hereafter, each container may include or more packages, items, or the like that may each have distinct destinations. As such, the operating density received at operation 315 may, in some embodiments, represent the number of packages within each container supported by the conveyor, the number of packages to be removed, if any, from each container, and/or the number of packages to be added, if any, to each container. Said differently, the computing device may, for example, determine that each container supported by conveyor 102 represents an increase in the travel time (e.g., described hereafter with reference to FIG. 4) of one (1) second. In such an example, a conveyor that supports three (3) containers would have an operating density that increases the travel time of the conveyor by three (3) seconds. In some instances, however, one or more of the containers may be manipulated or processed by an operator while supported by the conveyor (e.g., a package removed from or added to the respective container). As such, the computing device may be configured to determine a time value associated with the manipulation of the container (e.g., a dwell time) and adjust the operating density accordingly.

In some embodiments, the operating density received at operation 315 may be generated by the computing device 200 based upon monitoring (via scanning devices, camera systems, or the like) of the containers supported by the conveyor for a period of time. Said differently, the computing device may receive data indicative of the travel time adjustment due to the number of containers (e.g., operating density) supported by the conveyor in previous travel path determinations. For example, the computing device may analyze historical travel path and travel time determinations as described herein and determine the adjustment, if any, to the travel time associated with the conveyor (e.g., each conveyor in the network 101) based upon historical performance of each conveyor (e.g., increase or decrease the travel time based upon previous performance). In some embodiments, the computing device 200 may employ artificial intelligence, machine learning techniques, predicative analytics, or the like to dynamically adjust operating density determinations by the computing device 200. For example, the computing device may receive an operating density at operation 315 that indicates an increase in the number of containers having a starting location and destination location similar to those of the first container. In response, the computing device 200 may adjust the travel time associated with conveyors between this starting location and destination location to account for a forthcoming increase in operating density.

As shown in operation 320, the apparatus (e.g., container transportation system 100 and/or computing device 200) includes means, such as input/output circuitry 206, communications circuitry 208, travel circuitry 210, or the like, for determining a first travel path for the first container between the starting location and the destination location based upon the conveyor length, the conveyor operating speed, and the operating density for each conveyor in the conveyor network. As described hereafter with reference to FIG. 4, the computing device 200 may determine a travel time associated with each conveyor between the starting location and the destination location for the first container. As described above, the conveyor network may include a plurality of interconnected conveyors such that transportation of a container between a starting location and a destination location may include any number of conveyors or combination of conveyors (e.g. a selected set of conveyors). As such, each set of conveyors may define a unique travel path for the first container between the starting location and the destination location.

In order to determine a first travel path that minimizes a total travel time for the first container, the travel time associated with each conveyor may be determined based upon the conveyor length, conveyor operating speed, and operating density of each conveyor. By way of example, the structural parameters of each conveyor may be received by the computing device as part of normal operation of the system 100. For example, the conveyor length associated with each conveyor may be inputted to the computing device 200 or determined by the computing device as part of an initial set up procedure. Any change in the conveyor length of a conveyor within the conveyor network may be provided to the computing device 200 for storage. Given that each of the conveyors or a combination of conveyors may be operably coupled to the computing device, the computing device may similarly be configured to receive a conveyor operating speed associated with each conveyor. For example, each conveyor or propulsions device (e.g., motor) coupled to the conveyor may periodically (in real time) transmit the conveyor operating speed associated with the receptive conveyor to the computing device 200.

In this way, the computing device 200 may, based upon the conveyor length and the conveyor operating speed, determine a base travel time associated with each conveyor. For example, a conveyor having a conveyor length of five (5) meters and a conveyor operating speed of five (5) meters per minute will have a base travel time of one (1) minute. The computing device at operation 320 may adjust the base travel time to account for the time increase or decrease associated with the operating density for each respective conveyor. By way of continued example, the computing device 200 may receive an operating density of ten (10) packages on the conveyor and determine (via historical data analysis, current monitoring, or the like) that an operating density of ten (10) packages, for example, corresponds to an increase in three (3) seconds per package. As such, the computing device at operation 320 may increase the base travel time of one (1) minute by thirty (30) seconds to determine a travel time of 1.5 minutes for a particular conveyor.

Figure 4:
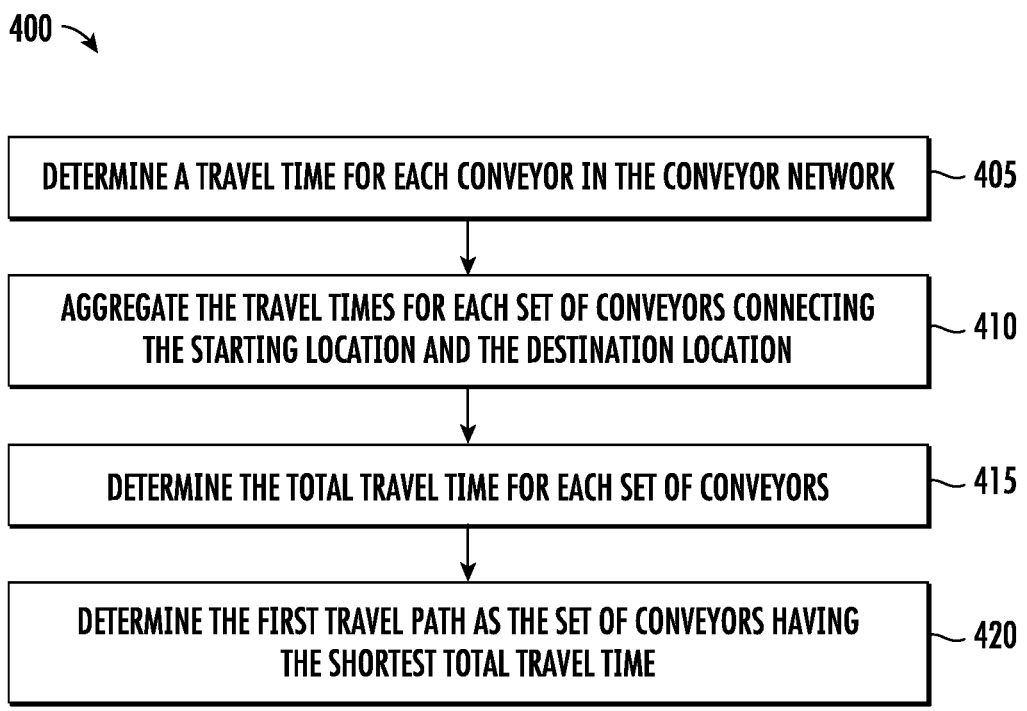
FIG. 4 illustrates an example flowchart for travel path determinations, in accordance with some example embodiments described herein.

In some embodiments, as described further with reference to FIG. 4, the computing device may determine a base travel time associated with each set of conveyors connecting the starting location and the destination location wherein each set of conveyors defines a unique travel path for the container. By way of example, the structural parameters of each conveyor may be received by the computing device as part of normal operation of the system 100 as described above. Following determination of a travel time associated with each conveyor based upon the conveyor length and conveyor operating speed, the computing device may aggregate or otherwise sum the travel time for each conveyor within each set to determine a base travel time for the set of conveyors. Given that the operating density of interconnected conveyors may operate to influence the operating density of other conveyors, the computing device may account for this influence by analyzing the operating density for each set of conveyors to determine the first travel path. For example, a first conveyor with an increased number of containers may affect the operating density of an adjacent second conveyor such that a set of conveyors that includes the first conveyor and the second conveyor is affected by the operating density of the first conveyor. Similarly, in some embodiments, the computing device 200 may perform historical analysis of prior determined travel paths that include each set of conveyors to account for the interconnected nature of these conveyors.

FIG. 4 illustrates a flowchart containing a series of operations for travel path determinations. The operations illustrated in FIG. 4 may, for example, be performed by, with the assistance of, and/or under the control of an apparatus (e.g., computing device 200), as described above. In this regard, performance of the operations may invoke one or more of processor 202, memory 204, input/output circuitry 206, communications circuitry 208, and/or travel circuitry 210.

As shown in operation 405, the apparatus (e.g., container transportation system 100 and/or computing device 200) includes means, such as input/output circuitry 206, communications circuitry 208, travel circuitry 210, or the like, for determining a travel time for each conveyor in the conveyor network. As described above, the structural parameters of each conveyor may be received by the computing device as part of normal operation of the system 100 (e.g. periodically, in response to a query by the computing device 200, or the like). Similarly, the computing device 200 may be configured to receive a conveyor operating speed associated with each conveyor during operation (e.g., periodically, in response to a query from the computing device, etc.). Based upon the conveyor length and the conveyor operating speed, the computing device may determine a base travel time associated with each conveyor and/or may determine a base travel time associated with each set of conveyors. By way of continued example, a conveyor having a conveyor length of five (5) meters and a conveyor operating speed of five (5) meters per minute will have a base travel time of one (1) minute. In order to determine the base travel time associated with a set of conveyors, the computing device 200 may sum the base travel time associated with each conveyor in the set of conveyors. Given that the conveyor length and/or the conveyor operating speed may dynamically change during operation (e.g., removal of slats from a slatted conveyor, increasing motor drive, or the like), the determination of the base travel time for each conveyor may be iteratively performed in real time.

The computing device at operation 405, as described above, adjusts the base travel time (for each conveyor and/or for each set of conveyors) to account for the time increase or decrease associated with the operating density for each respective conveyor in each respective set. By way of continued example, the computing device 200 may receive an operating density of ten (10) packages on the conveyor and determine (via historical data analysis, current monitoring, or the like) that an operating density of ten (10) packages, for example, corresponds to an increase in three (3) seconds per package. As such, the computing device at operation 320 may increase the base travel time of one (1) minute by thirty (30) seconds to determine a travel time of 1.5 minutes for a particular conveyor. In order to provide a more holistic view of each set of conveyors, the computing device 200 may receive an operating density associated with the set of conveyors (e.g., the number of packages following the same travel path associated with the set of conveyors). For example, the computing device may receive an operating density of one hundred (100) packages on a set of conveyors and determine (via historical data analysis, current monitoring, or the like) that an operating density of one hundred (100) packages, for example, corresponds to an increase in three (3) minutes for the entire set (e.g., a three minute increase in travel time for the unique path provided by the set of conveyors). Although described with reference to an example that indicates a linear relationship between operating density and travel time, the present disclosure contemplates that any relationship between operating density and travel time may exist based upon the intended application, container type, etc. (e.g., the travel time may vary exponentially, logarithmically, etc.).

As shown in operations 410 and 415, the apparatus (e.g., container transportation system 100 and/or computing device 200) includes means, such as input/output circuitry 206, communications circuitry 208, travel circuitry 210, or the like, for aggregating the travel times for each set of conveyors connecting the starting location and the destination location and determining the total travel time for each set of conveyors based upon this aggregation. As described above, a travel time (e.g., base travel time adjusted to account for operating density) is determined for each set of conveyors where each set of conveyors defines a unique travel path for the first container between the starting location and the destination location. In order to determine this total travel time, the travel time for each conveyor may be aggregated, summed, or otherwise combined to provide a total travel time indicative of the time value required to transport the first container from the starting location to the destination location along each respective set of conveyors.

As shown in operation 420, the apparatus (e.g., container transportation system 100 and/or computing device 200) includes means, such as input/output circuitry 206, communications circuitry 208, travel circuitry 210, or the like, for determining the first travel path as the set of conveyors having the shortest total travel time. By way of example, determination of the total travel time for each set of conveyors may provide a numerical time value associated with the potential transporting of the first container along each respective set of conveyors. In order to minimize the total travel time for the first container between the starting location and the destination location, the computing device 200 may operate to select from amongst the plurality of travel times the travel time with the lowest or smallest numerical time value. The computing device 200 may subsequently select the collection of conveyors (e.g., set) associated with the lowest numerical time value as the first travel path for the first conveyor. Although described herein with reference to selection of the lowest numerical time value, the present disclosure contemplates that this determination at operation 420 may employ any number of statistical analysis techniques or procedures (e.g., averaging, removing outliers, etc.) in order to improve the accuracy of the first travel path determination.

Furthermore, the travel path determination at operations 410, 415, may, in some embodiments, employ one or more algorithms or data structures configured to selectively determine the travel time associated with particular sets of conveyors or conveyor segments. Said differently, in some embodiments, the travel time for only some sets of conveyors connecting the starting location with the destination location may be calculated. For example, the computing device 200 may utilize a nearest neighbor algorithm or travelling salesman problem (TSP) algorithm to select candidate sets of conveyors and determine the travel time for only the candidate sets. In this way, the computing device 200 may reduce the load on the computing device 200 while maximizing computational efficiency.

Figure 5:
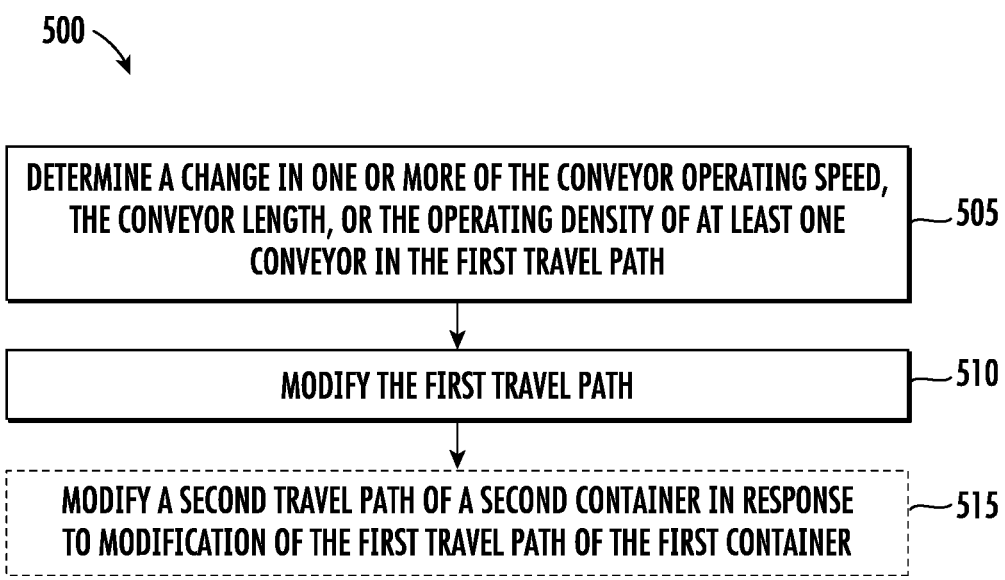
FIG. 5 illustrates an example flowchart for travel path modifications, in accordance with some example embodiments described herein.

FIG. 5 illustrates a flowchart containing a series of operations for travel path modifications. The operations illustrated in FIG. 5 may, for example, be performed by, with the assistance of, and/or under the control of an apparatus (e.g., computing device 200), as described above. In this regard, performance of the operations may invoke one or more of processor 202, memory 204, input/output circuitry 206, communications circuitry 208, and/or travel circuitry 210.

As shown in operation 505, the apparatus (e.g., container transportation system 100 and/or computing device 200) includes means, such as input/output circuitry 206, communications circuitry 208, travel circuitry 210, or the like, for determining a change in one or more of the conveyor operating speed, the conveyor length, or the operating density of at least one conveyor in the first travel path. As described above, the computing device 200 may be operably connected with the conveyor network such that the computing device 200, periodically or in response to a request, receives a conveyor length and a conveyor operating speed for each of the conveyors. As either of these parameters change, the travel time associated with each conveyor also changes. As such, the computing device, with reference to FIG. 5, may iteratively determine the first travel path such that changes to the conveyor length, conveyor operating speed, and/or operating density are addressed. The determination at operation 505 may be calculated on a set time interval. For example, the computing device 200 may periodically receive operating parameters (e.g., conveyor speed, conveyor length, operating density, etc.) based upon such time interval (e.g., every minute). Although described herein with reference to a minute time interval, the present disclose contemplates that the operating parameters may be received by the computing device at any time or in response to any change in operating parameter.

By way of example, a modular conveyor or slatted conveyor may be used by the system 100 such that the conveyor length L of such a conveyor is adjustable. In an instance in which one or more slats are added to or removed from the conveyor, the conveyor length L may decrease or increase, respectively. Similarly, the conveyor operating speed of each conveyor may be adjusted by, for example, changes in output of a propulsion device (e.g., motor) coupled to each (or a plurality of) conveyors. In an instance in which the output from the propulsion device increases, for example, the conveyor operating speed may similarly increase (in the absence of other changes). As such, the travel time associated with these conveyors may also change in response to a change in the conveyor operating speed or the conveyor length. The operating density for each conveyor may also dynamically change during operation of the system 100. As containers are transported, based upon determined travel paths, the volume of containers on each conveyor or a set of conveyors may also change. Such a change in container volume, interactions with containers, or the like may result in an increase or decrease in operating density for associated conveyors and/or an associated set of conveyors.

As such, as shown in operation 510, the apparatus (e.g., container transportation system 100 and/or computing device 200) includes means, such as input/output circuitry 206, communications circuitry 208, travel circuitry 210, or the like, for modifying the first travel path in response to a change in one or more of the conveyor operating speed, the conveyor length, or the operating density. As described above, the computing device 200 may operate to iteratively determine the travel time associated with each conveyor in the conveyor network as well as the travel time associated with a set of conveyors that provide a unique travel path between the starting location and the destination location. In response to a change in the conveyor operating speed, the conveyor length, or the operating density for any conveyor, the computing device 200 may recalculate the travel time for each conveyor, aggregate the travel times for each set of conveyors, and modify the first travel path as the set of conveyors having the shortest total travel time. By way of example, the operating speed of a conveyor in the set of conveyors of the first travel path may slow such that another set of conveyors now comprises the shortest total travel time. The computing device may modify the first travel path to reflect this change and may cause the container to travel the modified first travel path, for example, by redirecting the container to the modified first travel path.

In some embodiments, the modification of the first travel path of the first container may operate to affect the operating density of a travel path associated with other containers (e.g., a second container). As such, as shown in operation 515, the apparatus (e.g., container transportation system 100 and/or computing device 200) includes means, such as input/output circuitry 206, communications circuitry 208, travel circuitry 210, or the like, for modifying a second travel path of a second container in response to modification of the first travel path of the first container. By way of example, redirection of the first container to the modified first travel path may increase the operating density of a conveyor in the set of conveyors associated with the second travel path (e.g., a travel path that minimizing the total travel time for a second container between a starting location and a destination location for the second container). As such, the computing device 200 may perform the operations of FIG. 3 for the second container and determine a modified second travel path for the second container. As would be evident by the embodiments described herein, modification of one or more travel paths may also be iteratively performed in order to minimize the travel time for all containers supported by the conveyor network 101. In some instances, this determination may operate to minimize the average transportation time for all containers as a whole (e.g., without minimizing the travel time of any particular container) such that throughput for the system 100 is maximized.

Figure 6:
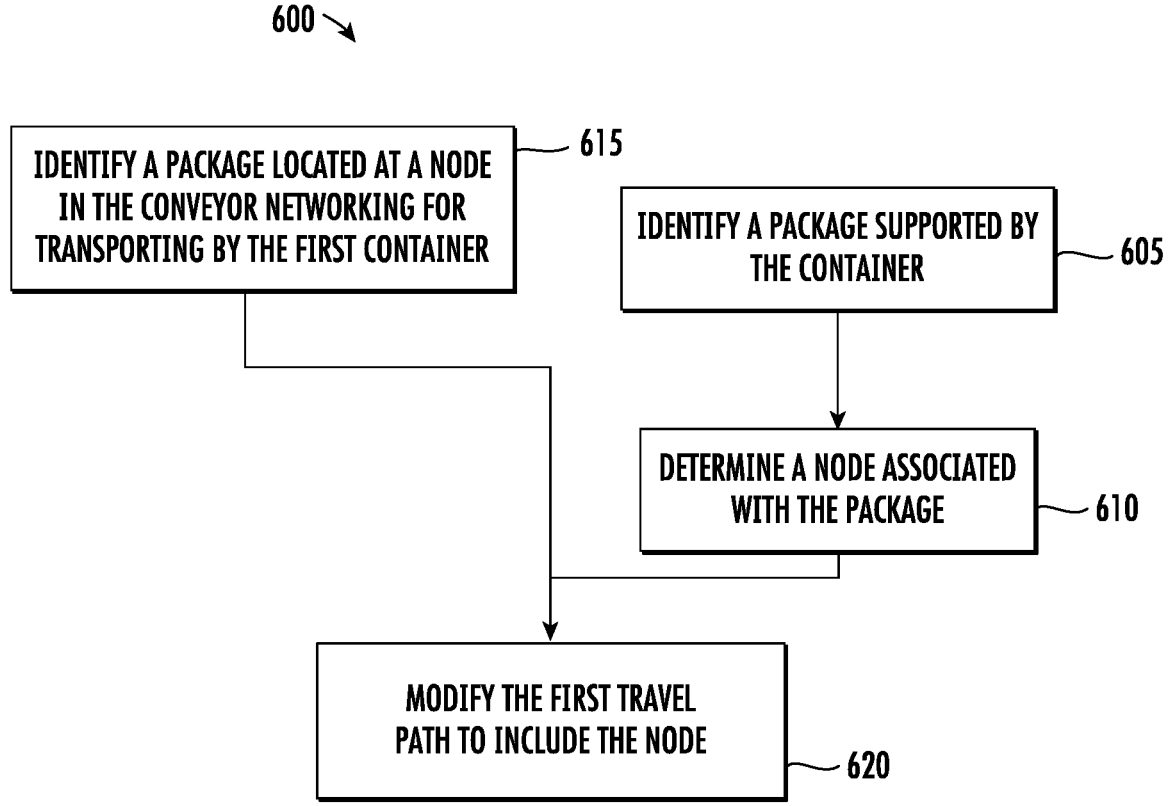
FIG. 6 illustrates an example flowchart for node deliveries, in accordance with some example embodiments, described herein.

FIG. 6 illustrates a flowchart containing a series of operations for node deliveries. The operations illustrated in FIG. 6 may, for example, be performed by, with the assistance of, and/or under the control of an apparatus (e.g., computing device 200), as described above. In this regard, performance of the operations may invoke one or more of processor 202, memory 204, input/output circuitry 206, communications circuitry 208, and/or travel circuitry 210.

As described above, each container within the conveyor network 101 may include one or more packages, items, etc. each of which may be associated with distinct destinations. In order to ensure proper delivery of all packages, the embodiments of FIG. 6 may provide for node deliveries that modify travel paths to include particular nodes. As shown in operation 605, for example, the apparatus (e.g., container transportation system 100 and/or computing device 200) includes means, such as input/output circuitry 206, communications circuitry 208, travel circuitry 210, or the like, for identifying a package supported by the container. By way of example, in some embodiments, the readable indicia of the container may indicate the contents of the container such that a scanning device that scans the readable indicia may determine the number of packages within the container as well as their associated destinations. In some instances, the destinations for the packages within the container are the same as the destination location of the container. In such an instance, modification to the first travel path of the first container to accommodate the destinations of the packages of the first container may be unnecessary.

In other embodiments, as shown in operation 610, the apparatus (e.g., container transportation system 100 and/or computing device 200) includes means, such as input/output circuitry 206, communications circuitry 208, travel circuitry 210, or the like, for determining a node associated with the package. As described above, a plurality of nodes 103 may be disposed within the conveyor network 101 and operate to allow interaction by operators (e.g., human or automated) with the containers supported by the conveyors. In an instance in which the destination of at least one package within the first container is different from the destination location for the first container, the computing device may determine a node associated with the package (e.g., a node that is or is proximate to the destination of the package). By way of example, a package within the first container may have a destination associated with a first node that is not along the first travel path of the first container.

In response to the determination at operation 620, the apparatus (e.g., container transportation system 100 and/or computing device 200) includes means, such as input/output circuitry 206, communications circuitry 208, travel circuitry 210, or the like, for modifying the first travel path to include the node at operation 615. By way of continued example, the computing device may modify the first travel path of the first container to include the first node in order to allow the package within the container to reach its destination. Said differently, the computing device may operate to minimize the total travel time for the first container while also ensuring that the first travel path includes the first node.

In some instances, as shown in operation 615, the apparatus (e.g., container transportation system 100 and/or computing device 200) includes means, such as input/output circuitry 206, communications circuitry 208, travel circuitry 210, or the like, for identifying a package located at a node in the conveyor networking for transporting by the first container. In addition to removing packages from containers, the system 100 may also accommodate the addition of packages to the contents of containers along respective travel paths. For example, a package that is currently located at the first node may be scanned, identified by a camera, or the like and determined to have a destination that corresponds with the destination location of the first container. As such, the computing device may modify the first travel path, as shown in operation 620 described above, of the first container to include the first node in order to allow the package located at the first node to be transported by the first container to its destination. Said differently, the computing device may operate to minimize the total travel time for the first container while also ensuring that the first travel path includes the first node.

As described above, various technical challenges are surmounted via technical solutions contemplated herein. For instance, example implementations of embodiments of the present invention may determine the conveyor length, operating speed, and operating density (e.g., container congestion) associated with each conveyor in a conveyor network and dynamically select a set of conveyors that minimizes the total travel time for a container between a starting and destination location. Unlike the rigidity provided by traditional systems, embodiments described herein may operate to identify changes in one or more of the operating speed, conveyor length, or operating density of any conveyor within the conveyor network and dynamically modify the travel path of each container in order to minimize travel time for all containers supported by the described system. Furthermore, the embodiments described herein may account for the contents of a particular container in order to ensure packages supported by each container are properly delivered to their respective locations. In doing so, such example implementations reliably increase the throughput of conveyor networks resulting in improved system efficiencies.

FIGS. 3-6 thus illustrate flowcharts describing the operation of apparatuses, systems methods, and computer program products according to example embodiments contemplated herein. It will be understood that each flowchart block, and combinations of flowchart blocks, may be implemented by various means, such as hardware, firmware, processor, circuitry, and/or other devices associated with execution of software including one or more computer program instructions. For example, one or more of the operations described above may be implemented by an apparatus executing computer program instructions. In this regard, the computer program instructions may be stored by a memory 204 of the computing device 200 and executed by a processor 202 of the computing device 200. As will be appreciated, any such computer program instructions may be loaded onto a computer or other programmable apparatus (e.g., hardware) to produce a machine, such that the resulting computer or other programmable apparatus implements the functions specified in the flowchart blocks. These computer program instructions may also be stored in a computer-readable memory that may direct a computer or other programmable apparatus to function in a particular manner, such that the instructions stored in the computer-readable memory produce an article of manufacture, the execution of which implements the functions specified in the flowchart blocks. The computer program instructions may also be loaded onto a computer or other programmable apparatus to cause a series of operations to be performed on the computer or other programmable apparatus to produce a computer-implemented process such that the instructions executed on the computer or other programmable apparatus provide operations for implementing the functions specified in the flowchart blocks.

The flowchart blocks support combinations of means for performing the specified functions and combinations of operations for performing the specified functions. It will be understood that one or more blocks of the flowcharts, and combinations of blocks in the flowcharts, can be implemented by special purpose hardware-based computer systems which perform the specified functions, or combinations of special purpose hardware with computer instructions.

What is claimed is:

1. A system for container transportation comprising:
a conveyor network comprising a plurality of conveyors, wherein each of the conveyors is configured to support one or more containers thereon, each of the conveyors defining:
a conveyor length; and
a conveyor operating speed; and
a computing device operably coupled to the conveyor network, wherein the computing device is configured to:
receive a starting location of a first container within the conveyor network;
receive a destination location of the first container within the conveyor network;
receive an operating density for each of the conveyors in the conveyor network;
determine a first travel path for the first container between the starting location and the destination location based upon the conveyor length, the conveyor operating speed, and the operating density for each of the conveyors in the conveyor network, and
determine a travel time for each of the conveyors in the conveyor network based on one or more of the conveyor length, the conveyor operating speed, the operating density, and historical performance of each of the conveyors in the conveyor network;
wherein the first travel path is configured to minimize a total travel time for the first container between the starting location and the destination location.

2. The system according to claim 1, wherein the computing device is further configured to:
aggregate the travel times for each set of the conveyors connecting the starting location and the destination location, wherein each set of the conveyors defines a unique travel path for the first container;
determine the total travel time for each set of the conveyors; and
determine the first travel path as the set of conveyors having the shortest total travel time.

3. The system according to claim 1, wherein the computing device is further configured to:
determine a change in one or more of the conveyor operating speed, the conveyor length, or the operating density of at least one of the conveyors in the first travel path; and
modify the first travel path.

4. The system according to claim 3, wherein the computing device is further configured to modify a second travel path of a second container in response to modification of the first travel path of the first container.

5. The system according to claim 1, wherein the conveyor network further comprises a plurality of nodes, wherein each of the nodes is positioned adjacent at least one of the conveyors in the conveyor network.

6. The system according to claim 5, wherein the computing device is further configured to:
identify a package supported by the container;
determine a node associated with the package; and
modify the first travel path to include the node.

7. The system according to claim 5, wherein the computing device is further configured to:
identify a package located at a node in the conveyor networking for transporting by the first container; and
modify the first travel path to include the node.

8. A method for container transportation, the method comprising:
receiving a starting location of a first container within a conveyor network, wherein the conveyor network comprises a plurality of conveyors, wherein each of the conveyors is configured to support one or more containers thereon, and wherein each of the conveyors defines a conveyor length and a conveyor operating speed;
receiving a destination location of the first container within the conveyor network;
receiving an operating density for each of the conveyors in the conveyor network; and
determining a first travel path for the first container between the starting location and the destination location based upon the conveyor length, the conveyor operating speed, and the operating density for each of the conveyors in the conveyor network, wherein the first travel path is configured to minimize a total travel time for the first container between the starting location and the destination location; and
determining a travel time for each of the conveyors in the conveyor network based on one or more of the conveyor length, the conveyor operating speed, the operating density, and historical performance of each of the conveyors in the conveyor network.

9. The method according to claim 8, further comprising:
determining a travel time for each of the conveyors in the conveyor network;
aggregating the travel times for each set of the conveyors connecting the starting location and the destination location, wherein each set of the conveyors defines a unique travel path for the first container;
determining the total travel time for each set of the conveyors; and
determining the first travel path as the set of conveyors having the shortest total travel time.

10. The method according to claim 8, further comprising:
determining a change in one or more of the conveyor operating speed, the conveyor length, or the operating density of at least one of the conveyors in the first travel path; and
modifying the first travel path.

11. The method according to claim 10, further comprising modifying a second travel path of a second container in response to modification of the first travel path of the first container.

12. The method according to claim 8, wherein the conveyor network further comprises a plurality of nodes, wherein each of the nodes is positioned adjacent at least one of the conveyors in the conveyor network.

13. The method according to claim 12, further comprising:
identifying a package supported by the container;
determining a node associated with the package; and
modifying the first travel path to include the node.

14. The method according to claim 12, further comprising:
identifying a package located at a node in the conveyor networking for transporting by the first container; and
modifying the first travel path to include the node.

15. A computer program product comprising at least one non-transitory computer-readable storage medium having computer-readable program code portions stored therein, the computer-readable program code portions comprising an executable portion configured to:
receive a starting location of a first container within a conveyor network, wherein the conveyor network comprises a plurality of conveyors, wherein each of the conveyors is configured to support one or more containers thereon, and wherein each of the conveyors defines a conveyor length and a conveyor operating speed;

receive a destination location of the first container within the conveyor network;

receive an operating density for each of the conveyors in the conveyor network; and determine a first travel path for the first container between the starting location and the destination location based upon the conveyor length, the conveyor operating speed, and the operating density for each of the conveyors in the conveyor network, wherein the first travel path is configured to minimize a total travel time for the first container between the starting location and the destination location and determine a travel time for each of the conveyors in the conveyor network based on one or more of the conveyor length, the conveyor operating speed, the operating density, and historical performance of each of the conveyors in the conveyor network.

16. The computer program product according to claim 15, wherein the computer-readable program code portions comprising the executable portion are configured to:

determine a travel time for each of the conveyors in the conveyor network;

aggregate the travel times for each set of the conveyors connecting the starting location and the destination location, wherein each set of the conveyors defines a unique travel path for the first container;

determine the total travel time for each set of the conveyors; and determine the first travel path as the set of conveyors having the shortest total travel time.

17. The computer program product according to claim 15, wherein the computer-readable program code portions comprising the executable portion are configured to:

determine a change in one or more of the conveyor operating speed, the conveyor length, or the operating density of at least one of the conveyors in the first travel path; and modify the first travel path.

18. The computer program product according to claim 15, wherein the computer-readable program code portions comprising the executable portion are configured to modify a second travel path of a second container in response to modification of the first travel path of the first container.

19. The computer program product according to claim 15, wherein the computer-readable program code portions comprising the executable portion are configured to identifying a package supported by the container;

determining a node associated with the package; and modifying the first travel path to include the node.

20. The computer program product according to claim 15, wherein the computer-readable program code portions comprising the executable portion are configured to identifying a package located at a node in the conveyor networking for transporting by the first container; and modifying the first travel path to include the node.

* * * * *